United States Patent
Zheng et al.

(10) Patent No.: US 11,117,101 B2
(45) Date of Patent: *Sep. 14, 2021

(54) SELECTIVELY PERMEABLE GRAPHENE OXIDE MEMBRANE

(71) Applicant: NITTO DENKO CORPORATION, Osaka (JP)

(72) Inventors: Shijun Zheng, San Diego, CA (US); Weiping Lin, Carlsbad, CA (US); Yuji Yamashiro, Osaka (JP); Isamu Kitahara, San Diego, CA (US); John Ericson, Poway, CA (US); Ozair Siddiqui, Murrieta, CA (US); Wanyun Hsieh, San Diego, CA (US); Peng Wang, San Diego, CA (US); Craig Roger Bartels, San Diego, CA (US); Makoto Kobuke, Osaka (JP); Shunsuke Noumi, Shiga (JP)

(73) Assignee: NITTO DENKO CORPORATION, Osaka (JP)

( * ) Notice: Subject to any disclaimer, the term of this patent is extended or adjusted under 35 U.S.C. 154(b) by 4 days.

This patent is subject to a terminal disclaimer.

(21) Appl. No.: 16/492,924

(22) PCT Filed: Mar. 23, 2018

(86) PCT No.: PCT/US2018/023968
§ 371 (c)(1),
(2) Date: Sep. 10, 2019

(87) PCT Pub. No.: WO2018/175853
PCT Pub. Date: Sep. 27, 2018

(65) Prior Publication Data
US 2020/0016547 A1    Jan. 16, 2020

Related U.S. Application Data

(60) Provisional application No. 62/476,135, filed on Mar. 24, 2017.

(51) Int. Cl.
*B01D 69/12* (2006.01)
*B01D 61/02* (2006.01)
(Continued)

(52) U.S. Cl.
CPC ......... *B01D 69/125* (2013.01); *B01D 61/025* (2013.01); *B01D 67/0079* (2013.01);
(Continued)

(58) Field of Classification Search
CPC .. B01D 71/021; B01D 71/024; B01D 69/125; B01D 61/025; B01D 67/0079;
(Continued)

(56) References Cited

U.S. PATENT DOCUMENTS

2008/0000830 A1    1/2008  Mabuchi et al.
2008/0053922 A1    3/2008  Honsinger, Jr. et al.
(Continued)

FOREIGN PATENT DOCUMENTS

CN    101043911 A    9/2007
CN    103338845 A    10/2013
(Continued)

OTHER PUBLICATIONS

International Search Report and Written Opinion, PCT/US2018/023968, dated Jun. 1, 2018.
(Continued)

*Primary Examiner* — Krishnan S Menon
(74) *Attorney, Agent, or Firm* — Maschoff Brennan; Brent A. Johnson; David W. Old

(57) ABSTRACT

Described herein is a crosslinked graphene and biopolymer (e.g. lignin) based composite membrane that provides selective resistance for solutes while providing water permeability. The membrane may include optional additional functional additives in a crosslinked material matrix that provides enhanced salt separation from water. Methods for
(Continued)

making such membranes, and methods of using the membranes for dehydrating or removing solutes from water are also described.

18 Claims, 3 Drawing Sheets

(51) Int. Cl.
*B01D 67/00* (2006.01)
*B01D 69/02* (2006.01)
*B01D 69/14* (2006.01)
*B01D 71/02* (2006.01)
*B01D 71/56* (2006.01)
*B01D 71/74* (2006.01)

(52) U.S. Cl.
CPC ......... *B01D 67/0095* (2013.01); *B01D 69/02* (2013.01); *B01D 69/148* (2013.01); *B01D 71/021* (2013.01); *B01D 71/027* (2013.01); *B01D 71/56* (2013.01); *B01D 71/74* (2013.01); *B01D 2323/08* (2013.01); *B01D 2323/12* (2013.01); *B01D 2323/30* (2013.01); *B01D 2325/04* (2013.01); *B01D 2325/24* (2013.01)

(58) Field of Classification Search
CPC .. B01D 67/0095; B01D 69/02; B01D 69/148; B01D 71/027; B01D 71/56; B01D 71/74; B01D 2323/08; B01D 2323/12; B01D 2323/30; B01D 2325/04; B01D 2325/24; B01D 67/0083; B01D 69/10; B01D 69/105; B01D 69/12
See application file for complete search history.

(56) References Cited

U.S. PATENT DOCUMENTS

| | | |
|---|---|---|
| 2012/0041146 A1 | 2/2012 | Zhang et al. |
| 2013/0284665 A1 | 10/2013 | Lee et al. |
| 2014/0080971 A1 | 3/2014 | Saito et al. |
| 2014/0322433 A1 | 10/2014 | Lee et al. |
| 2015/0368540 A1* | 12/2015 | Monclin ............ C09K 8/64 507/101 |
| 2016/0144328 A1 | 5/2016 | Schlenoff et al. |
| 2016/0159956 A1 | 6/2016 | Thiele et al. |
| 2016/0200850 A1 | 7/2016 | Hatanaka et al. |
| 2016/0222138 A1 | 8/2016 | Hamann et al. |

FOREIGN PATENT DOCUMENTS

| | | |
|---|---|---|
| CN | 106192376 A | 12/2016 |
| JP | 2001017841 A | 1/2001 |
| JP | 2009536874 A | 10/2009 |
| JP | 2015500737 A | 1/2015 |
| JP | 2016047521 A | 4/2016 |
| KR | 101432218 B1 | 9/2014 |
| WO | 2016021731 A1 | 2/2016 |
| WO | 2018049160 A1 | 3/2018 |
| WO | 2019028280 A1 | 2/2019 |

OTHER PUBLICATIONS

Office Action in corresponding Chinese application, CN 201880020365. 7, dated Jun. 23, 2021; machine translation also attached.
Rashidi et al., Graphene Oxide Membranes in Extreme Operating Environments: Concentration of Kraft Black Liquor by Lignin Retention, ACS Sustainable Chemistry & Engineering, 5(1), 1002-1009, Jan. 2017.

* cited by examiner

SELECTIVELY PERMEABLE GRAPHENE OXIDE MEMBRANE

CROSS-REFERENCE TO RELATED APPLICATIONS

This application is a national phase application of PCT/US2018/023968, filed on Mar. 23, 2018, which claims the benefit of U.S. Provisional Application No. 62/476,135, filed Mar. 24, 2017, which is incorporated by reference by its entirety.

FIELD

The present embodiments are related to polymeric membranes, including membranes comprising graphene materials for uses such as water treatment, desalination of saline water, and/or water removal.

BACKGROUND

Due to the increase of human population and water consumption coupled with limited freshwater resources on earth, technologies such as seawater desalination and water treatment/recycle to provide safe and fresh water have become more important to our society. The desalination process using reverse osmosis membrane is the leading technology for producing fresh water from saline water. Most of current commercial reverse osmosis membranes adopt a thin-film composite (TFC) configuration consisting of a thin aromatic polyamide selective layer on top of a microporous substrate; typically a polysulfone membrane on non-woven polyester. Although these reverse osmosis membranes can provide excellent salt rejection rate and higher water flux, thinner and more hydrophilic membranes are still desired to further improve energy efficiency of the reverse osmosis process. Therefore, new membrane materials and synthetic methods are in high demand to achieve the desired properties as described above.

SUMMARY

This disclosure relates to a graphene oxide membrane composition suitable for high water flux applications. The graphene oxide membrane composition may be prepared by using one or more water soluble crosslinkers, such as a lignin. Methods of efficiently and economically making these graphene oxide membrane compositions are also described. Water can be used as a solvent in preparing these graphene oxide membrane compositions, which makes the membrane preparation process more environmentally friendly and more cost effective.

Some embodiments include a selectively permeable membrane, such as a water permeable membrane, comprising: a porous support; and a composite coated on the porous support comprising a crosslinked graphene oxide compound, wherein the crosslinked graphene oxide compound is formed by reaction of a mixture comprising a graphene oxide compound and a crosslinker comprising biopolymer, such as a lignin; wherein the membrane is water permeable and sufficiently strong to withstand a water pressure of 50 pounds per square inch while controlling water flow through the membrane.

Some embodiments include a method of making a selectively water permeable membrane described herein, comprising: curing an aqueous mixture that is coated onto a porous support. In some embodiments, curing is carried out at an elevated temperature, such as a temperature of 90° C. to 150° C., for at least 30 seconds, such as about 30 seconds to 5 hours to facilitate crosslinking within the aqueous mixture. The porous support is coated with the aqueous mixture by applying the aqueous mixture to the porous support, and repeating as necessary to achieve a layer having a thickness of about 50-2000 nm. The aqueous mixture is formed by mixing a graphene oxide material, a crosslinker comprising biopolymer, such as a lignin, and an additive, in an aqueous liquid.

Some embodiments include a method of removing a solute from an unprocessed solution comprising exposing the unprocessed solution to any membrane disclosed herein.

DETAILED DESCRIPTION

A selectively permeable membrane includes a membrane that is relatively permeable for a particular fluid, such as a particular liquid or gas, but impermeable for other materials, including other fluids or solutes. For example, a membrane may be relatively permeable to water or water vapor and relatively impermeable to ionic compounds or heavy metals. In some embodiments, the selectively permeable membrane can be permeable to water while being relatively impermeable to salts.

As used herein, the term "fluid communication" means that a fluid can pass through a first component and travel to and through a second component or more components regardless of whether they are in physical communication or the order of arrangement.

The present disclosure relates to water separation membranes where a highly hydrophilic composite material with low organic compound permeability and high mechanical and chemical stability may be useful to support a polyamide salt rejection layer in a reverse osmosis membrane. This membrane material may be suitable for solute removal from an unprocessed fluid, such as desalination from saline water, purifying drinking water, or waste water treatment. Some selectively permeable membranes described herein are graphene oxide-based membranes having a high water flux, which may improve the energy efficiency of reverse osmosis membranes and improve water recovery/separation efficiency. In some embodiments, the graphene oxide-based membrane can comprise one or more filtering layers, where at least one layer can comprise a composite containing graphene oxide (GO), such as a graphene that is covalently bonded or crosslinked to other compounds or between graphene platelets. It is believed that a crosslinked GO layer, with graphene oxide's potential hydrophilicity and selective permeability, may provide a membrane for broad applications where high water permeability with high selectivity of permeability is important. In addition, these selectively permeable membranes may also be prepared using water as a solvent, which can make the manufacturing process much more environmentally friendly and cost effective.

Figure 1:
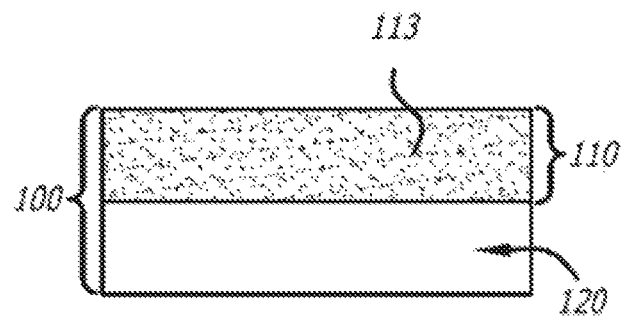
FIG. 1 is a depiction of a possible embodiment of a water permeable membrane without a salt rejection layer or a protective coating.

Generally, a selectively permeable membrane, such as a water permeable membrane comprises a porous support and a composite coated onto or disposed on the support. For example, as depicted in FIG. 1, selectively permeable membrane 100 can include porous support 120. Composite 110 is coated onto porous support 120.

In some embodiments, the porous support may be sandwiched between to composite layers.

Additional optional filtering layers may also be present, such as a salt rejection layer, etc. In addition, the membrane can also include a protective layer. In some embodiments, the protective layer can comprise a hydrophilic polymer. In some embodiments, the fluid, such as a liquid or gas, passing through the membrane travels through all the components regardless of whether they are in physical communication or their order of arrangement.

Figure 2:
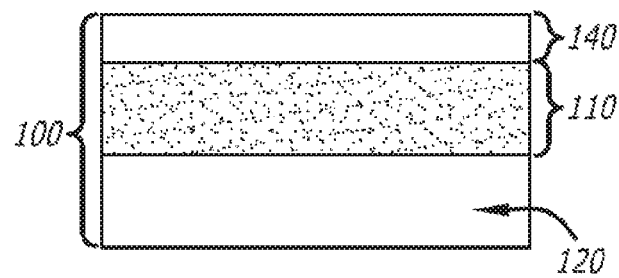
FIG. 2 is a depiction a possible embodiment of a water permeable membrane without a salt rejection layer but with a protective coating.

A protective layer may be placed in any position that helps to protect the selectively permeable membrane, such as a water permeable membrane, from harsh environments, such as compounds with may deteriorate the layers, radiation, such as ultraviolet radiation, extreme temperatures, etc. For example, in FIG. 2, selectively permeable membrane 100, represented in FIG. 1, may further comprise protective coating 140, which is disposed on, or over, composite 110.

Some selectively permeable membranes, such as water permeable membranes, can allow the passage of water and/or water vapor, but resists the passage of solute. For some membranes the solute restrained can comprise ionic compounds such as salts or heavy metals.

A water permeable membrane, such as one described herein, can be used to remove water from a control volume. In some embodiments, a membrane may be disposed between a first fluid reservoir and a second fluid reservoir such that the reservoirs are in fluid communication through the membrane. In some embodiments, the first reservoir may contain a feed fluid upstream and/or at the membrane.

In some embodiments, the membrane selectively allows liquid water or water vapor to pass through while keeping solute, or liquid material from passing through. In some embodiments, the fluid upstream of the membrane can comprise a solution of water and solute. In some embodiments, the fluid downstream of the membrane may contain purified water or processed fluid. In some embodiments, as a result of the layers, the membrane may provide a durable desalination system that can be selectively permeable to water, and less permeable to salts. In some embodiments, as a result of the layers, the membrane may provide a durable reverse osmosis system that may effectively filter saline water, polluted water or feed fluids.

A selectively permeable membrane, such as a water permeable membrane, may further comprise a salt rejection layer to help prevent salts from passing through the membrane.

Figure 3:
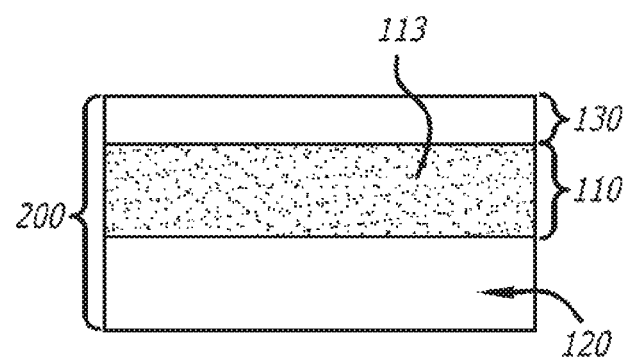
FIG. 3 is a depiction of a possible embodiment of a water permeable membrane with a salt rejection layer but without a protective coating.
Figure 4:
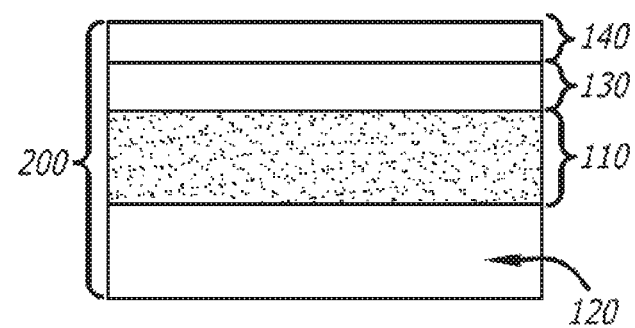
FIG. 4 is a depiction of a possible embodiment of a water permeable membrane with a salt rejection layer and a protective coating.

Some non-limiting examples of a selectively permeable membrane comprising a salt rejection layer are depicted in FIGS. 3 and 4. In FIGS. 3 and 4, membrane 200 comprises a salt rejection layer 130 that is disposed on composite 110, which is disposed on porous support 120. In FIG. 4, selectively permeable membrane 200 further comprises protective coating 140 which is disposed on salt rejection layer 130.

In some embodiments, the membrane exhibits a normalized volumetric water flow rate of about 10-1000 gal·ft$^{-2}$·day$^{-1}$·bar$^{-1}$; about 20-750 gal·ft$^{-2}$·day$^{-1}$·bar$^{-1}$; about 100-500 gal·ft$^{-2}$·day$^{-1}$·bar$^{-1}$; about 10-50 gal·ft$^{-2}$·day$^{-1}$·bar$^{-1}$; about 50-100 gal·ft$^{-2}$·day$^{-1}$·bar$^{-1}$; about 10-200 gal·ft$^{-2}$·day$^{-1}$·bar$^{-1}$; about 200-400 gal·ft$^{-2}$·day$^{-2}$·bar$^{-1}$; about 400-600 gal·ft$^{-2}$·day$^{-1}$·bar$^{-1}$; about 600-800 gal·ft$^{-2}$·day$^{-1}$·bar$^{-1}$; about 800-1000 gal·ft$^{-1}$·day$^{-1}$·bar$^{-1}$; at least about 10 gal·ft$^{-2}$·day$^{-1}$·bar$^{-1}$, about 20 gal·ft$^{-1}$·day$^{-1}$·bar$^{-1}$, about 100 gal·ft$^{-1}$·day$^{-1}$·bar$^{-1}$, about 200 gal·ft$^{-2}$·day$^{-1}$·bar$^{-1}$ or any normalized volumetric water flow rate in a range bounded by any of these values.

In some embodiments, a membrane may be selectively permeable. In some embodiments, the membrane may be an osmosis membrane. In some embodiments, the membrane may be a water separation membrane. In some embodiments, the membrane may be a reverse osmosis membrane. In some embodiments, the selectively permeable membrane may comprise multiple layers, wherein at least one layer contains a composite which is a product of a reaction of a mixture comprising a graphene oxide compound and a crosslinker.

The membranes described herein can comprise a composite formed by reacting a mixture to form covalent bonds. The mixture that is reacted to form the composite can comprise a graphene oxide compound and a biopolymer such as a lignin. In addition to a biopolymer, such as a lignin, polyvinyl alcohol may be present as a second crosslinker. Additionally, an additive can be present in the reaction mixture. The reaction mixture may form covalent bonds, such as crosslinking bonds, between the constituents of the composite (e.g., graphene oxide compound, the lignin, polyvinyl alcohol, and/or additives). For example a platelet of a graphene oxide compound may be bonded to another platelet, a graphene oxide compound may be bonded to a crosslinker (such as a lignin or polyvinyl alcohol), a graphene oxide compound may be bonded to an additive, a crosslinker (such as a lignin or polyvinyl alcohol) may be bonded to an additive, etc. In some embodiments, any combination of graphene oxide compound, a crosslinker (such as a lignin or polyvinyl alcohol), and additive can be covalently bonded to form a material matrix.

In some embodiments, the graphene oxide in a composite layer, can have an interlayer distance or d-spacing of about 0.5-3 nm, about 0.6-2 nm, about 0.7-1.8 nm, about 0.8-1.7 nm, about 0.9-1.7 nm, about 1.2-2 nm, about 1.5-2.3 nm, about 1.61 nm, about 1.67 nm, about 1.55 nm or any distance in a range bounded by any of these values. The d-spacing can be determined by x-ray powder diffraction (XRD).

The composite layer can have any suitable thickness. For example, some graphene oxide-based composite layers may have a thickness ranging from about 5-2000 nm, about 50-2000 nm, about 5-1000 nm, about 1000-2000 nm, about 10-500 nm, about 50-500 nm, about 500-1000 nm, about 50-500 nm, about 50-400 nm, about 20-1,000 nm, about 5-40 nm, about 10-30 nm, about 20-60 nm, about 50-100 nm, about 70-120 nm, about 120-170 nm, about 150-200 nm, about 180-220 nm, about 200-250 nm, about 220-270 nm, about 250-300 nm, about 280-320 nm, about 300-400 nm, about 330-480 nm, about 400-600 nm, about 600-800 nm, about 800-1000 nm, about 50-500 nm, about 100-400 nm, about 100 nm, about 150 nm, about 200 nm, about 225 nm, about 250 nm, about 300 nm, about 350 nm, about 400 nm, or any thickness in a range bounded by any of these values. Ranges above that encompass the following thicknesses are of particular interest: about 100 nm, about 200 nm, about 225 nm, and about 300 nm.

In general, graphene-based materials have many attractive properties, such as a 2-dimensional sheet-like structure with extraordinary high mechanical strength and nanometer scale thickness. The graphene oxide (GO), an exfoliated oxidation of graphite, can be mass produced at low cost. With its high degree of oxidation, graphene oxide has high water permeability and also exhibits versatility to be functionalized by many functional groups, such as amines or alcohols to form various membrane structures. Unlike traditional membranes, where the water is transported through the pores of the material, in graphene oxide membranes the transportation of water can be between the interlayer spaces. Graphene oxide's capillary effect can result in long water slip lengths that offer a fast water transportation rate. Additionally, the membrane's selectivity and water flux can be controlled by adjusting the interlayer distance of graphene sheets, or by the utilization of different crosslinking moieties.

In the membranes disclosed, a graphene oxide material compound includes an optionally substituted graphene oxide. In some embodiments, the optionally substituted graphene oxide may contain a graphene which has been chemically modified, or functionalized. A modified graphene may be any graphene material that has been chemically modified, or functionalized. In some embodiments, the graphene oxide can be optionally substituted.

Unless otherwise indicated, when a compound or a chemical structure, such as graphene oxide, is referred to as being "optionally substituted," it includes a compound or a chemical structure that either has no substituents (i.e., unsubstituted), or has one or more substituents (i.e., substituted). The term "substituent" has the broadest meaning known in the art, and includes a moiety that replaces one or more hydrogen atoms attached to a parent compound or structure. In some embodiments, a substituent may be any type of group that may be present on a structure of an organic compound, which may have a molecular weight (e.g., the sum of the atomic masses of the atoms of the substituent) of 15-50 g/mol, 15-100 g/mol, 15-150 g/mol, 15-200 g/mol, 15-300 g/mol, or 15-500 g/mol. In some embodiments, a substituent comprises, or consists of: 0-30, 0-20, 0-10, or 0-5 carbon atoms; and 0-30, 0-20, 0-10, or 0-5 heteroatoms, wherein each heteroatom may independently be: N, O, S, Si, F, Cl, Br, or I; provided that the substituent includes one C, N, O, S, Si, F, Cl, Br, or I atom. Examples of substituents include, but are not limited to, alkyl, alkenyl, alkynyl, heteroalkyl, heteroalkenyl, heteroalkynyl, aryl, heteroaryl, hydroxy, alkoxy, aryloxy, acyl, acyloxy, alkylcarboxylate, thiol, alkylthio, cyano, halo, thiocarbonyl, O-carbamyl, N-carbamyl, O-thiocarbamyl, N-thiocarbamyl, C-amido, N-amido, S-sulfonamido, N-sulfonamido, isocyanato, thiocyanato, isothiocyanato, nitro, silyl, sulfenyl, sulfinyl, sulfonyl, haloalkyl, haloalkoxy, trihalomethanesulfonyl, trihalomethanesulfonamido, amino, etc.

For convenience, the term "molecular weight" is used with respect to a moiety or part of a molecule to indicate the sum of the atomic masses of the atoms in the moiety or part of a molecule, even though it may not be a complete molecule.

Functionalized graphene is a graphene oxide compound that includes one or more functional groups not present in graphene oxide, such as functional groups that are not OH, COOH, or an epoxide group directly attached to a C-atom of the graphene base. Examples of functional groups that may be present in functionalized graphene include halogen, alkene, alkyne, cyano, ester, amide, or amine.

In some embodiments, at least about 99%, at least about 95%, at least about 90%, at least about 80%, at least about 70%, at least about 60%, at least about 50%, at least about 40%, at least about 30%, at least about 20%, at least about 10%, or at least about 5% of the graphene molecules in a graphene oxide compound may be oxidized or functionalized. In some embodiments, the graphene oxide compound is graphene oxide, which may provide selective permeability for gases, fluids, and/or vapors. In some embodiments, the graphene oxide compound can also include reduced graphene oxide. In some embodiments, the graphene oxide compound can be graphene oxide, reduced-graphene oxide, functionalized graphene oxide, or functionalized and reduced-graphene oxide. In some embodiments, the graphene oxide compound is graphene oxide that is not functionalized.

It is believed that there may be a large number (~30%) of epoxy groups on graphene oxide, which may be readily reactive with hydroxyl groups at elevated temperatures. It is also believed that graphene oxide sheets have an extraordinary high aspect ratio which provides a large available gas/water diffusion surface as compared to other materials, and it has the ability to decrease the effective pore diameter of any substrate supporting material to minimize contaminant infusion while retaining flux rates. It is also believed that the epoxy or hydroxyl groups increase the hydrophilicity of the materials, and thus contributes to the increase in water vapor permeability and selectivity of the membrane.

In some embodiments, the optionally substituted graphene oxide may be in the form of sheets, planes or flakes. In some embodiments, the graphene material may have a surface area of about 100-5000 $m^2/g$, about 150-4000 $m^2/g$, about 200-1000 $m^2/g$, about 500-1000 $m^2/g$, about 1000-2500 $m^2/g$, about 2000-3000 $m^2/g$, about 100-500 $m^2/g$, about 400-500 $m^2/g$, or any surface area in a range bounded by any of these values.

In some embodiments, the graphene oxide may be platelets having 1, 2, or 3 dimensions with size of each dimension independently in the nanometer to micron range. In some embodiments, the graphene may have a platelet size in any one of the dimensions, or may have a square root of the area of the largest surface of the platelet, of about 0.05-100 µm, about 0.05-50 µm, about 0.1-50 µm, about 0.5-10 µm, about 1-5 µm, about 0.1-2 µm, about 1-3 µm, about 2-4 µm, about 3-5 µm, about 4-6 µm, about 5-7 µm, about 6-8 µm, about 7-10 µm, about 10-15 µm, about 15-20 µm, about 20-50 µm, about 50-100 µm, about 60-80 µm, about 50-60 µm, about 25-50 µm, or any platelet size in a range bounded by any of these values.

In some embodiments, the graphene oxide material can comprise at least 70%, at least 75%, at least 80%, at least 85%, at least 90%, at least 95%, at least 97%, or at least 99% of graphene material having a molecular weight of about 5,000-200,000 Daltons.

In some embodiments, the mass percentage of the graphene oxide relative to the total weight of the composite can be about 4-80 wt %, about 4-75 wt %, about 5-70 wt %, about 7-65 wt %, about 7-60 wt %, about 7.5-55 wt %, about 8-50 wt %, about 8.5-50 wt %, about 15-50 wt %, about 1-5 wt %, about 3-8 wt %, about 5-10 wt %, about 7-12 wt %, about 10-15 wt %, about 12-17 wt %, about 12.8-13.3 wt %, about 13-13.5 wt %, about 13.2-13.7 wt %, about 13.4-13.9 wt %, about 13.6-14.1 wt %, about 13.8-14.3 wt %, about 14-14.5 wt %, about 14.2-14.7 wt %, about 14.4-14.9 wt %, about 14.6-15.1 wt %, about 14.8-15.3 wt %, about 15-15.5 wt %, about 15.2-15.7 wt %, about 15.4-15.9 wt %, about 15.6-16.1 wt %, about 12-14 wt %, about 13-15 wt %, about 14-16 wt %, about 15-17 wt %, about 16-18 wt %, about 15-20 wt %, about 17-23 wt %, about 20-25 wt %, about 23-28 wt %, about 25-30 wt %, about 30-40 wt %, about 35-45 wt %, about 40-50 wt %, about 45-55 wt %, or about 50-70 wt %, or any percentage in a range bounded by any of these values. Ranges above that encompass the following weight percentages of the graphene oxide compound, such as graphene oxide, are of particular interest: about 13.2 wt %, about 15.0 wt %, and about 15.3 wt %.

The composite is formed by reacting a mixture containing a graphene oxide compound and a crosslinker. The crosslinker comprises biopolymer such as a lignin, and may further comprise a second crosslinker, such as a polyvinyl alcohol.

In some embodiments, the crosslinker may be a plant-based polymer such as a lignin. Lignins are crosslinked phenolic polymers, such as a polymer comprising crosslinked paracoumaryl alcohol, coniferyl alcohol, sinapyl alcohol, or a combination thereof, or derivatives of these polymers. For example, a lignin can be sulfonated, such as a lignosulfonate, or a salt thereof such as sodium lignosulfonate (CAS: 8061-51-6), calcium lignosulfonate, magnesium lignosulfonate, potassium lignosulfonate, etc. In some embodiments, the crosslinker comprises sodium lignosulfonate.

In some embodiments, the weight average molecular weight of lignosulfonate may be about 20-40 Da, about 30-50 Da, about 40-60 Da, about 50-70 Da, about 60-80 Da, about 70-90 Da, about 80-100 Da, about 90-110 Da, about 100-120 Da, about 110-130 Da, about 120-140 Da about 52,000 Da, or any molecular weight in a range bounded by any of these values.

In some embodiments, the number average molecular weight of lignosulfonate may be about 2-7 Da, about 4-9 Da, about 6-11 Da, about 8-13 Da, about 7,000 Da, or any molecular weight in a range bounded by any of these values.

The lignin, such as lignosulfonate, may be present in any suitable amount. For example, with respect to the total weight of the composite, the lignin may be present in an amount of 0.1-90 wt %, 0.1-10 wt %, 5-15 wt %, 10-20%, about 18-22 wt %, about 20-24 wt %, about 22-26 wt %, about 24-28 wt %, about 26-30 wt %, about 28-32 wt %, about 30-34 wt %, about 32-36 wt %, about 34-38 wt %, about 36-40 wt %, about 38-42 wt %, about 40-50 wt %, about 45-55 wt %, about 50-54 wt %, about 52-56 wt %, about 54-58 wt %, about 56-60 wt %, about 58-62 wt %, about 60-64 wt %, about 62-66 wt %, about 64-68 wt %, about 66-70 wt %, about 68-72 wt %, about 70-74 wt %, about 72-76 wt %, about 74-78 wt %, about 76-80 wt %, about 78-82 wt %, about 80-100 wt %, or any weight percentage in a range bounded by any of these values. Any of the above ranges which encompass any of the following percentages of the lignin, such as lignosulfonate, are of particular interest: 25 wt %, 37 wt %, 38 wt %, 57 wt %, 72 wt %, 73 wt %, 74 wt %, 75 wt %, 76 wt %, and 77 wt %.

In some composites, the graphene oxide and lignin may be bonded to form a network of crosslinkages or a material matrix. The bonding can be physical or chemical. The bonding can be direct or indirect; such as through a linking group that covalently connects the graphene oxide to the lignin.

In some membranes, the crosslinker can further comprise a polyvinyl alcohol. In some embodiments, the weight ratio of polyvinyl alcohol to lignin can be in range of 0-10 (10 mg of polyvinyl alcohol and 1 mg of lignin is a ratio of 10), 0.1-2, 0.2-0.4, 0.3-0.5, 0.4-0.6, 0.5-1, 0.6-1.1, 0.8-1.2, or 0.2-1.5.

The molecular weight of the polyvinyl alcohol (PVA) may be about 100-1,000,000 Daltons (Da), about 10,000-500,000 Da, about 10,000-50,000 Da, about 50,000-100,000 Da, about 70,000-120,000 Da, about 80,000-130,000 Da, about 90,000-140,000 Da, about 90,000-100,000 Da, about 95,000-100,000 Da, about 89,000-98,000 Da, about 89,000 Da, about 98,000 Da, or any molecular weight in a range bounded by any of these values.

In some composites, the weight ratio of PVA to biopolymer (weight ratio=weight of PVA÷weight of biopolymer) can be about 0.0-5, about 0.01-2.5, about 0.33-2, such as 0, about 0.05, about 0.33, about 1, about 2 (for example 2 mg of PVA per 1 mg of biopolymer).

In some embodiments, the weight percentage of polyvinyl alcohol, based on the total weight of the composite, is about 0.1-5 wt %, about 2-5 wt %, about 3-6 wt %, about 4-10%, about 8-15 wt %, about 12-20 wt %, about 18-22 wt %, about 20-24 wt %, about 22-26 wt %, about 24-28 wt %, about 26-30 wt %, about 28-32 wt %, about 30-34 wt %, about 32-36 wt %, about 34-38 wt %, about 36-40 wt %, about 38-42 wt %, about 40-50 wt %, about 45-55 wt %, about 50-54 wt %, about 52-56 wt %, about 55-65 wt %, about 60-70 wt %, about 65-75%, about 70-74 wt %, about 72-76 wt %, about 74-78 wt %, about 76-80 wt %, about 78-82 wt %, or about 80-90 wt %, or any weight percentage in a range bounded by any of these values. Any of the above ranges which encompass any of the following percentages of polyvinyl alcohol, are of particular interest: 4 wt %, 19 wt %, 25 wt %, 37 wt %, 38 wt %, 50 wt %, and 77 wt %.

In some embodiments, the weight ratio of crosslinker to GO (weight ratio=weight of crosslinker÷weight of graphene oxide) can be about 0.25-15, about 0.2-13, about 0.3-12, about 0.5-10, about 3-9, about 4-8, about 4.5-6, such as about 4.7, about 4.9, about 5 (for example 5 mg of crosslinker and 1 mg of optionally substituted graphene oxide), or any ratio in a range bounded by any of these values. In some membranes, the weight ratio of crosslinker to graphene oxide can be in a range of 2-6.

It is believed that crosslinking the graphene oxide can also enhance the graphene oxide's mechanical strength and water permeable properties by creating strong chemical bonding and wide channels between graphene platelets to allow water to pass through the platelets easily, while increasing the mechanical strength between the moieties within the composite. In some embodiments, at least about 1%, about 5%, about 10%, about 20%, about 30%, about 40% about 50%, about 60%, about 70%, about 80%, about 90%, about 95%, or all of the graphene oxide platelets may be crosslinked. In some embodiments, the majority of the graphene material may be crosslinked. The amount of crosslinking may be estimated based on the weight of the crosslinker as compared with the total amount of graphene material.

An additive or an additive mixture may, in some instances, improve the performance of the composite. In some embodiments, the additive or additive mixture can comprise $CaCl_2$, a borate salt, silica nanoparticles, or any combination thereof.

Some additives or additive mixtures can comprise calcium chloride. In some embodiments, calcium chloride is about 0-2%, about 0-1.5%, about 0.4-1.5%, about 0.4-0.8%, about 0.6-1%, about 0.8-1.2%, about 0-1.5%, about 0-1%, about 0.8%, of the weight of the composite, or any weight percentage in a range bounded by any of these values. Any of the above ranges which encompass about 0.8% by weight calcium chloride are of particular interest.

In some embodiments, the additive or the additive mixture can comprise a borate salt. In some embodiments, the borate salt comprises a tetraborate salt for example $K_2B_4O_7$, $Li_2B_4O_7$, and $Na_2B_4O_7$. In some embodiments, the borate salt can comprise $K_2B_4O_7$. In some embodiments, the weight percentage of borate salt based upon the total weight of the composite may be in a range of about 0-20%, about 0.5-15%, about 4-8%, about 6-10%, about 8-12%, about 10-14%, or about 1-10%, or any weight percentage in a range bounded by any of these values. Any of the above ranges which encompass any of the following percentages of borate salt are of particular interest: 7 wt %, 8 wt %, and 10 wt.

The additive or the additive mixture can comprise silica nanoparticles. In some embodiments, at least one other additive is present with the silica nanoparticles. In some embodiments the silica nanoparticles may have an average size of about 5-200 nm, about 6-100 nm, about 6-50 nm, about 7-50 nm, about 2-8 nm, about 5-9 nm, about 5-15 nm, about 10-20 nm, about 15-25 nm, about 7-20 nm, about 18-22 nm, or any size in a range bounded by any of these values. The average size for a set of nanoparticles can be determined by taking the average volume and then determining the diameter associated with a comparable sphere which displaces the same volume to obtain the average size. Of particular interest are ranges recited above that encompass the following particle sizes: about 7 nm and about 20 nm.

In some embodiments, the silica nanoparticles are about 0-15%, about 0-10%, about 0-5%, about 1-10%, about 0.1-3%, about 2-4%, about 3-5%, about 4-6%, or about 0-6%, of the weight of the composite, or any range bounded by any of these values. Of particular interest are any ranges above that encompass any of the following values: about 1%, about 2%, and about 4%.

A porous support may be any suitable material and in any suitable form upon which a layer, such as a layers of the composite, may be deposited or disposed. In some embodiments, the porous support can comprise hollow fibers or porous material. In some embodiments, the porous support may comprise a porous material, such as a polymer or a hollow fiber. Some porous supports can comprise a non-woven fabric. In some embodiments, the polymer may be polyamide (Nylon), polyimide (PI), polyvinylidene fluoride (PVDF), polyethylene (PE), polypropylene (PP), polyethylene terephthalate (PET), polysulfone (PSF), polyether sulfone (PES), and/or mixtures thereof. In some embodiments, the polymer can comprise PET.

Some membranes further comprise a salt rejection layer, e.g. disposed on the composite coated on the support. In some embodiments, the salt rejection layer can give the membrane low salt permeability. A salt rejection layer may comprise any material that is suitable for reducing the passage of ionic compounds, or salts. In some embodiments, the salt rejected, excluded, or partially excluded, can comprise KCl, $MgCl_2$, $CaCl_2$, NaCl, $K_2SO_4$, $MgSO_4$, $CaSO_4$, or $Na_2SO_4$. In some embodiments, the salt rejected, excluded, or partially excluded, can comprise NaCl. Some salt rejection layers comprise a polymer, such as a polyamide or a mixture of polyamides. In some embodiments, the polyamide can be a polyamide made from an amine (e.g. meta-phenylenediamine, para-phenylenediamine, ortho-phenylenediamine, piperazine, polyethylenimine, polyvinylamine, or the like) and an acyl chloride (e.g. trimesoyl chloride, isophthaloyl chloride, or the like). In some embodiments, the amine can be meta-phenylenediamine. In some embodiments, the acyl chloride can be trimesoyl chloride. In some embodiments, the polyamide can be made from a meta-phenylenediamine and a trimesoyl chloride (e.g. by a polymerization reaction of meta-phenylenediamine and trimesoyl chloride).

Some membranes may further comprise a protective coating. For example, the protective coating can be disposed on top of the membrane to protect it from the environment. The protective coating may have any composition suitable for protecting a membrane from the environment. Many polymers are suitable for use in a protective coating such as one or a mixture of hydrophilic polymers, e.g. polyvinyl alcohol (PVA), polyvinyl pyrrolidone (PVP), polyethylene glycol (PEG), polyethylene oxide (PEO), polyoxyethylene (POE), polyacrylic acid (PAA), polymethacrylic acid (PMMA) and polyacrylamide (PAM), polyethylenimine (PEI), poly(2-oxazoline), polyethersulfone (PES), methyl cellulose (MC), chitosan, poly (allylamine hydrochloride) (PAH), and poly (sodium 4-styrene sulfonate) (PSS), and any combinations thereof. In some embodiments, the protective coating can comprise PVA.

Figure 5:
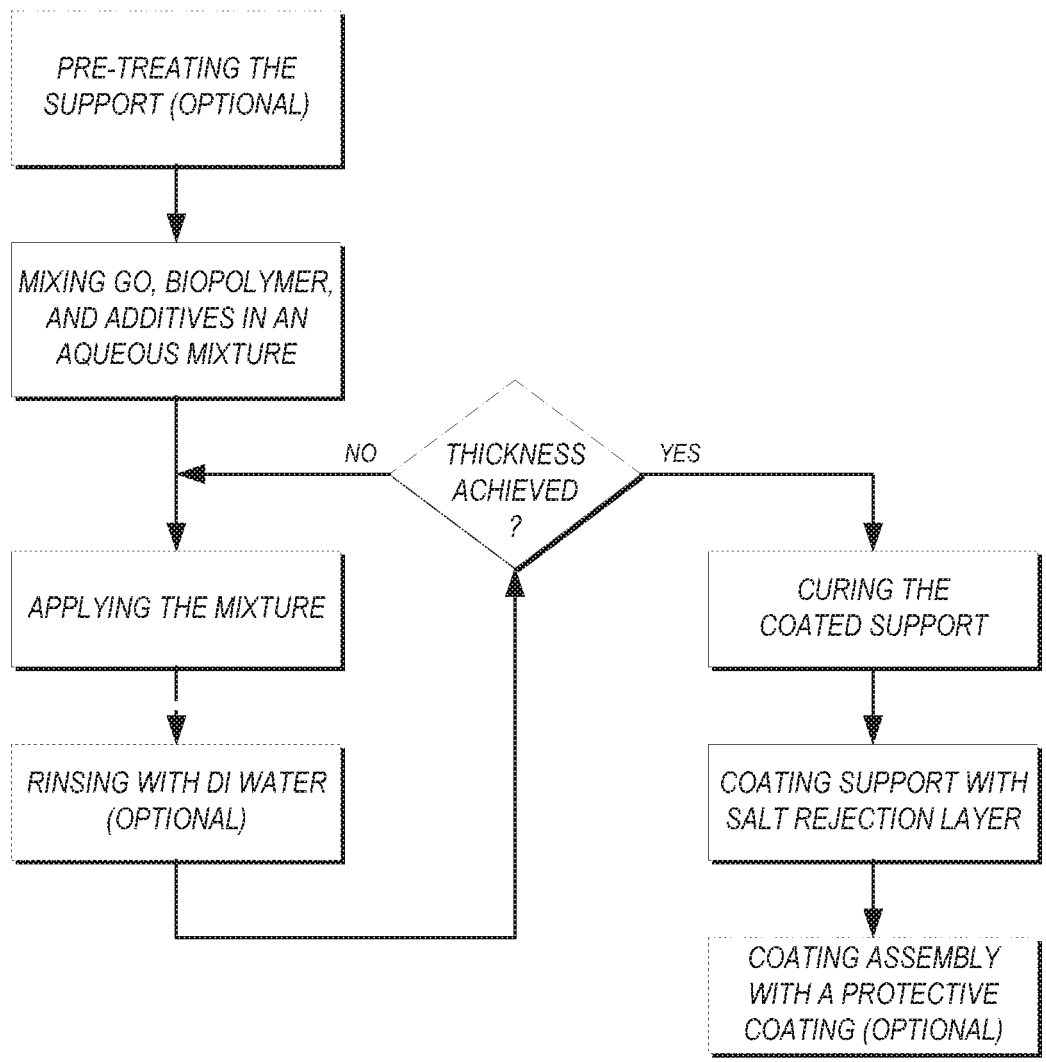
FIG. 5 is a depiction of a possible embodiment for the method of making a water permeable membrane.

Some embodiments include methods for making the selectively permeable membrane, such as a water permeable membrane, comprising: mixing the graphene oxide compound, the crosslinker (e.g. comprising a lignin, and optionally, a polyvinyl alcohol), and the additive in an aqueous mixture, applying the mixture to the porous support, repeating the application of the mixture to the porous support as necessary and curing the coated support. Some methods include coating the porous support with a composite. In some embodiments, the method optionally comprises pre-treating the porous support. In some embodiments, the method can further comprise applying a salt rejection layer. Some methods also include applying a salt rejection layer on the resulting assembly, followed by additional curing of resulting assembly. In some methods, a protective layer can also be placed on the assembly. An example of a possible embodiment of making the aforementioned membrane is shown in FIG. 5.

In some embodiments, mixing an aqueous mixture of graphene oxide material, crosslinker (e.g. comprising a lignin, and optionally, a polyvinyl alcohol) and additives can be accomplished by dissolving appropriate amounts of graphene oxide compound, polyvinyl alcohol, and additives (e.g. borate salt, calcium chloride, or silica nanoparticles) in water. Some methods comprise mixing at least two separate aqueous mixtures, e.g., a graphene oxide based mixture and a crosslinker and additives based mixture, then mixing appropriate mass ratios of the mixtures together to achieve the desired results. Other methods comprise creating one aqueous mixture by dissolving appropriate amounts by mass of graphene oxide material, crosslinker, and additives dispersed within the mixture. In some embodiments, the mixture can be agitated at temperatures and times sufficient to ensure uniform dissolution of the solute. The result is a mixture that can be coated onto the support and reacted to form the composite.

In some embodiments, the porous support can be optionally pre-treated to aid in the adhesion of the composite layer to the porous support. In some embodiments, an aqueous solution of polyvinyl alcohol can be applied to the porous support and then dried. For some solutions, the aqueous solution can comprise about 0.01 wt %, about 0.02 wt %, about 0.05 wt %, or about 0.1 wt % PVA. In some embodiments, the pretreated support can be dried at a temperature of 25° C., about 50° C., about 65° C., or 75° C. for 2 minutes, 10 minutes, 30 minutes, 1 hour, or until the support is dry.

In some embodiments, applying the mixture to the porous support can be done by methods known in the art for creating a layer of desired thickness. In some embodiments, applying the coating mixture to the substrate can be achieved by vacuum immersing the substrate into the coating mixture first, and then drawing the solution onto the substrate by applying a negative pressure gradient across the substrate until the desired coating thickness can be achieved. In some embodiments, applying the coating mixture to the substrate can be achieved by blade coating, spray coating, dip coating, die coating, or spin coating. In some embodiments, the method can further comprise gently rinsing the substrate with deionized water after each application of the coating mixture to remove excess loose material. In some embodiments, the coating is done such that a composite layer of a desired thickness is created. The desired thickness of membrane can be in a range of about 5-2000 nm, about 10-2000 nm, about 5-1000 nm, about 1000-2000 nm, about 10-500 nm, about 500-1000 nm, about 50-400 nm, about 50-150 nm, about 100-200 nm, about 150-250 nm, about 200-300 nm, about 250-350 nm, about 300-400 nm, about 10-200 nm, about 10-100 nm, about 10-50 nm, about 20-50 nm, about 50-500 nm, or any thickness in a range bounded by any of these values. Ranges that encompass the following thicknesses are of particular interest: about 100 nm, about 200 nm, about 225 nm, and about 300 nm. In some embodiments, the number of layers can be in a range of about 1-250, about 1-100, about 1-50, about 1-20, about 1-15, about 1-10, or about 1-5. This process results in a fully coated substrate, or a coated support.

For some methods, curing the coated support can then be done at temperatures and time sufficient to facilitate cross-linking between the moieties of the aqueous mixture deposited on porous support. In some embodiments, the coated support can be heated at a temperature of about 45-200° C., about 90-170° C., or about 90-150° C. In some embodiments, the coated support can be heated for a duration of at least about 30 seconds, at least about 1 minute, at least about 15 minutes, at least about 30 minutes, at least about 1 hour, at least about 3 hours, up to about 1 hour, up to about 3 hours, up to about 5 hours; with the time required decreasing for increasing temperatures. In some embodiments, the substrate can be heated at about 140° C. for about 1 minute or at about 90° C. for about 30 minutes. The result is a cured membrane.

In some embodiments, the method for fabricating membranes further comprises applying a salt rejection layer to the membrane or a cured membrane to yield a membrane with a salt rejection layer. In some embodiments, the salt rejection layer can be applied by dipping the cured membrane into a solution of precursors in mixed solvents. In some embodiments, the precursors can comprise an amine and an acyl chloride. In some embodiments, the precursors can comprise meta-phenylenediamine and trimesoyl chloride. In some embodiments, the concentration of meta-phenylenediamine can be in a range of about 0.01-10 wt %, about 0.1-5 wt %, about 5-10 wt %, about 1-5 wt %, about 2-4 wt %, about 4 wt %, about 2 wt %, or about 3 wt %. In some embodiments, the trimesoyl chloride concentration can be in a range of about 0.001-1 vol %, about 0.01-1 vol %, about 0.1-0.5 vol %, about 0.1-0.3 vol %, about 0.2-0.3 vol %, about 0.1-0.2 vol %, or about 0.14 vol %. In some embodiments, the mixture of meta-phenylenediamine and trimesoyl chloride can be allowed to rest for a sufficient amount of time such that polymerization can take place before the dipping occurs. In some embodiments, the method comprises resting the mixture at room temperature for about 1-6 hours, about 5 hours, about 2 hours, or about 3 hours. In some embodiments, the method comprises dipping the cured membrane in the coating mixture for about 15 seconds to about 15 minutes; about 5 seconds to about 5 minutes, about 10 seconds to about 10 minutes, about 5-15 minutes, about 10-15 minutes, about 5-10 minutes, or about 10-15 seconds.

In other embodiments, the salt rejection layer can be applied by coating the cured membrane in separate solutions of aqueous meta-phenylenediamine and a solution of trimesoyl chloride in an organic solvent. In some embodiments, the meta-phenylenediamine solution can have a concentration in a range of about 0.01-10 wt %, about 0.1-5 wt %, about 5-10 wt %, about 1-5 wt %, about 2-4 wt %, about 4 wt %, about 2 wt %, or about 3 wt %. In some embodiments, the trimesoyl chloride solution can have a concentration in a range of about 0.001-1 vol %, about 0.01-1 vol %, about 0.1-0.5 vol %, about 0.1-0.3 vol %, about 0.2-0.3 vol %, about 0.1-0.2 vol %, or about 0.14 vol %. In some embodiments, the method comprises dipping the cured membrane in the aqueous meta-phenylenediamine for a period of about 1 second to about 30 minutes, about 15 seconds to about 15 minutes; or about 10 seconds to about 10 minutes. In some embodiments, the method then comprises removing excess meta-phenylenediamine from the cured membrane. In some embodiments, the method then comprises dipping the cured membrane into the trimesoyl chloride solution for a period of about 30 seconds to about 10 minutes, about 45 seconds to about 2.5 minutes, or about 1 minute. In some embodiments, the method comprises subsequently drying the resultant assembly in an oven to yield a membrane with a salt rejection layer. In some embodiments, the cured membrane can be dried at about 45-200° C. for a period about 5-20 minutes, at about 75-120° C. for a period of about 5-15 minutes, or at about 90° C. for about 10 minutes. This process results in a membrane with a salt rejection layer.

In some embodiments, the method for fabricating a membrane can further comprise subsequently applying a protective coating on the membrane. In some embodiments, the applying a protective coating comprises adding a hydrophilic polymer layer. In some embodiments, applying a protective coating comprises coating the membrane with a PVA aqueous solution. Applying a protective layer can be achieved by methods such as blade coating, spray coating, dip coating, spin coating, and etc. In some embodiments, applying a protective layer can be achieved by dip coating of the membrane in a protective coating solution for about 1-10 minutes, about 1-5 minutes, about 5 minutes, or about 2 minutes. In some embodiments, the method further comprises drying the membrane at a temperature of about 75-120° C. for about 5-15 minutes, or at about 90° C. for about 10 minutes. The result is a membrane with a protective coating.

A water permeable membrane described herein may be used in methods of extracting liquid water from an unprocessed aqueous solution containing dissolved solutes, for applications such as pollutant removal or desalination. For example, an unprocessed solution may be exposed to a water permeable membrane described herein. One method further comprises passing the unprocessed solution through the membrane, so that the water is allowed to pass through while solutes are retained, thereby reducing the solute content of the resulting water.

Thus, during operation, a water permeable membrane can have a first aqueous solution (or unprocessed liquid) within the pores of the porous support, which has not passed through the composite, and a second aqueous solution in contact with a surface of the composite opposite the porous support, which has passed through the composite and has a reduced salt concentration. Thus, the first aqueous solution and the second aqueous solution have different concentrations of a salt.

The unprocessed water containing solute may be passed through the membrane by any of a number or methods, such as by applying a pressure gradient across the membrane. Applying a pressure gradient can be by supplying a means of producing head pressure across the membrane. In some embodiments, the head pressure can be sufficient to overcome osmotic back pressure.

In some embodiments, providing a pressure gradient across the membrane can be achieved by producing a positive pressure in the first reservoir, producing a negative pressure in the second reservoir, or producing a positive pressure in the first reservoir and producing a negative pressure in the second reservoir. In some embodiments, a means of producing a positive pressure in the first reservoir can be accomplished by using a piston, a pump, a gravity drop, and/or a hydraulic ram. In some embodiments, a means of producing a negative pressure in the second reservoir can be achieved by applying a vacuum or withdrawing fluid from the second reservoir.

The following embodiments are specifically contemplated:

Embodiment 1

A water permeable membrane comprising:

a porous support; and a composite coated on the porous support comprising a crosslinked graphene oxide compound, wherein the crosslinked graphene oxide compound is formed by reacting a mixture comprising a graphene oxide compound and a crosslinker comprising a lignin;

wherein the membrane is water permeable and sufficiently strong to withstand a water pressure of 50 pounds per square inch while controlling water flow through the membrane.

Embodiment 2

The water permeable membrane of embodiment 1, wherein the graphene oxide compound comprises graphene oxide, reduced-graphene oxide, functionalized graphene oxide, or functionalized and reduced-graphene oxide.

Embodiment 3

The water permeable membrane of embodiment 2, wherein the graphene oxide compound is graphene oxide.

Embodiment 4

The water permeable membrane of embodiment 1, 2, or 3, wherein the lignin comprises sodium lignosulfonate, calcium lignosulfonate, magnesium lignosulfonate, or potassium lignosulfonate.

Embodiment 5

The water permeable membrane of embodiment 1, 2, 3, or 4, wherein the crosslinker further comprises a polyvinyl alcohol.

Embodiment 6

The water permeable membrane of embodiment 5, wherein the weight ratio of polyvinyl alcohol to lignin is about 0 to 5.

Embodiment 7

The water permeable membrane of embodiment 1, 2, 3, 4, 5, or 6, wherein the composite further comprises a borate salt.

Embodiment 8

The water permeable membrane of embodiment 7, wherein the borate salt comprises $K_2B_4O_7$, $Li_2B_4O_7$, or $Na_2B_4O_7$.

Embodiment 9

The water permeable membrane of embodiment 7 or 8, wherein the borate salt is about 0 wt % to 20 wt % of the composite.

Embodiment 10

The water permeable membrane of embodiment 1, 2, 3, 4, 5, 6, 7, 8, or 9, wherein the composite further comprises $CaCl_2$.

Embodiment 11

The water permeable membrane of embodiment 10, wherein the $CaCl_2$ is 0 wt % to about 1.5 wt % of the composite.

Embodiment 12

The water permeable membrane of embodiment 1, 2, 3, 4, 5, 6, 7, 8, 9, 10, or 11, wherein the composite further comprises silica nanoparticles.

Embodiment 13

The water permeable membrane of embodiment 12, wherein the silica nanoparticles are 0 wt % to 10 wt % of the composite, wherein the average size of the silica nanoparticles is about 5 nm to about 200 nm.

Embodiment 14

The water permeable membrane of embodiment 1, 2, 3, 4, 5, 6, 7, 8, 9, 10, 11, 12, or 13, wherein the porous support is a non-woven fabric.

Embodiment 15

The water permeable membrane of embodiment 1, 2, 3, 4, 5, 6, 7, 8, 9, 10, 11, 12, 13, or 14, wherein the porous support comprises polyamide, polyimide, polyvinylidene fluoride, polyethylene, polypropylene, polyethylene terephthalate, polysulfone, or polyether sulfone.

Embodiment 16

The water permeable membrane of embodiment 15, wherein the porous support comprises polyethylene terephthalate.

Embodiment 17

The water permeable membrane of embodiment 1, 2, 3, 4, 5, 6, 7, 8, 9, 10, 11, 12, 13, 14, 15, or 16, having a thickness of about 10 nm to about 2000 nm.

Embodiment 18

The water permeable membrane of embodiment 1, 2, 3, 4, 5, 6, 7, 8, 9, 10, 11, 12, 13, 14, 15, 16, or 17, wherein the weight ratio of the crosslinker to the graphene oxide compound is about 2 to about 6.

Embodiment 19

The water permeable membrane of embodiment 1, 2, 3, 4, 5, 6, 7, 8, 9, 10, 11, 12, 13, 14, 15, 16, 17, or 18, further comprising a salt rejection layer to reduce a salt permeability of the membrane.

Embodiment 20

The water permeable membrane of embodiment 19, wherein the salt is NaCl.

Embodiment 21

The water permeable membrane of embodiment 19 or 20, wherein the salt rejection layer is disposed on the composite.

Embodiment 22

The water permeable membrane of embodiment 19, 20, or 21, wherein the salt rejection layer comprises a polyamide prepared by reacting meta-phenylenediamine and trimesoyl chloride.

Embodiment 23

The water permeable membrane of embodiment 1, 2, 3, 4, 5, 6, 7, 8, 9, 10, 11, 12, 13, 14, 15, 16, 17, 18, 19, 20, 21, or 22, wherein the composite is a layer having a thickness of about 50 nm to about 2000 nm.

Embodiment 24

The water permeable membrane of embodiment 1, 2, 3, 4, 5, 6, 7, 8, 9, 10, 11, 12, 13, 14, 15, 16, 17, 18, 19, 20, 21, 22, or 23, wherein the composite further contains water.

Embodiment 25

The water permeable membrane of embodiment 1, 2, 3, 4, 5, 6, 7, 8, 9, 10, 11, 12, 13, 14, 15, 16, 17, 18, 19, 20, 21, 22, 23, or 24, further comprising a first aqueous solution within the pores of the porous support and a second aqueous solution in contact with a surface of the composite opposite the porous support, wherein the first aqueous solution and the second aqueous solution have different concentrations of a salt.

Embodiment 26

A method of making a water permeable membrane comprising:
curing an aqueous mixture that is coated onto a porous support;
wherein the porous support is cured at a temperature of 90° C. to 150° C. for 30 seconds to 5 hours to facilitate crosslinking within the aqueous mixture;
wherein the porous support is coated with the aqueous mixture by applying the aqueous mixture to the porous support, and repeating as necessary to achieve a layer having a thickness of about 50 nm to about 2000 nm; and
wherein the aqueous mixture is formed by mixing a graphene oxide material, a crosslinker comprising a lignin, and an additive, in an aqueous liquid.

Embodiment 27

The method of embodiment 26, wherein the lignin comprises sodium lignosulfonate, calcium lignosulfonate, magnesium lignosulfonate, or potassium lignosulfonate.

Embodiment 28

The method of embodiment 26 or 27, wherein the crosslinker further comprises a polyvinyl alcohol.

Embodiment 29

The method of embodiment 26, 27, or 28, wherein the additive comprises $CaCl_2$, borate salt, or silica nanoparticles.

Embodiment 30

The method of embodiment 26, 27, 28, or 29, wherein the membrane is further coated with a salt rejection layer and the resultant assembly is cured at 45° C. to 200° C. for 5 minutes to 20 minutes.

Embodiment 31

A method of removing a solute from an unprocessed solution comprising exposing the unprocessed solution to the membrane of embodiment 1, 2, 3, 4, 5, 6, 7, 8, 9, 10, 11, 12, 13, 14, 15, 16, 17, 18, 19, 20, 21, 22, 23, 24, or 25.

Embodiment 32

The method of embodiment 31, wherein the unprocessed solution is passed through the membrane.

Embodiment 33

The method of embodiment 32, wherein the unprocessed solution is passed through the membrane by applying a pressure gradient across the membrane.

EXAMPLES

It has been discovered that embodiments of the selectively permeable membranes described herein have improved performance as compared to other selectively permeable membranes. These benefits are further demonstrated by the following examples, which are intended to be illustrative of the disclosure, but are not intended to limit the scope or underlying principles in any way.

Example 1.1.1

Preparation of Coating Mixture

Graphene Oxide Solution Preparation: Graphene oxide was prepared from graphite using the modified Hummers method. Graphite flakes (2.0 g) (Sigma Aldrich, St. Louis, Mo., USA, 100 mesh) were oxidized in a mixture of 2.0 g of $NaNO_3$ (Aldrich), 10 g $KMnO_4$ of (Aldrich) and 96 mL of concentrated $H_2SO_4$ (Aldrich, 98%) at 50° C. for 15 hours. The resulting paste like mixture was poured into 400 g of ice followed by adding 30 mL of hydrogen peroxide (Aldrich, 30%). The resulting solution was then stirred at room temperature for 2 hours to reduce the manganese dioxide, then filtered through a filter paper and washed with DI water. The solid was collected and then dispersed in DI water with stirring, centrifuged at 6300 rpm for 40 minutes, and the aqueous layer was decanted. The remaining solid was then dispersed in DI water again and the washing process was repeated 4 times. The purified graphene oxide was then dispersed in DI water under sonication (power of 10 W) for 2.5 hours to get the graphene oxide dispersion (0.4 wt %) as GO-1.

Preparation Coating Mixture: 10 mL of 2.5 wt % sodium lignosulfonate solution was prepared by dissolving sodium lignosulfonate (2.5 g, S1834, Spectrun Chemical) in DI water. Next, 0.1 mL of a 0.1 wt % aqueous solution of $CaCl_2$ (anhydrous, Aldrich) was added. Then, 0.21 mL of a 0.47 wt % of $K_2B_4O_7$ (Aldrich) was added and the resulting solution was stirred until mixed. The result was a crosslinker solution (XL-1). Then, GO-1 (1 mL) and XL-1 solutions were combined with 10 mL of DI water and sonicated for 6 minutes to ensure uniform mixing to create a coating solution (CS-1).

Example 2.1.1

Preparation of a Membrane

Membrane Preparation: A 7.6 cm diameter PET porous support, or substrate, (Hydranautics, San Diego, Calif. USA) was dipped into a 0.05 wt % PVA (Aldrich) in DI water solution. The substrate was then dried in an oven (DX400, Yamato Scientific Co., Ltd. Tokyo, Japan) at 65° C. to yield a pretreated substrate.

Mixture Application: The coating mixture (CS-1) was then filtered through the pretreated substrate under gravity to draw the solution through the substrate such that a layer 200 nm thick of coating was deposited on the support. The resulting membrane was then placed in an oven (DX400, Yamato Scientific) at 90° C. for 30 minutes to facilitate crosslinking. This process generated a membrane without a salt rejection layer (MD-1.1.1.1).

Example 2.1.1.1

Preparation of Additional Membranes

Additional membranes were constructed using the methods similar to Example 1.1.1 and Example 2.1.1, with the exception that parameters were varied for the as shown in Table 1. Specifically, individual concentrations were varied, and additional additives were added to aqueous Coating Additive Solution (e.g. $SiO_2$ (5-15 nm, Aldrich), $SiO_2$ (10-20 nm, Aldrich), PVA (Aldrich)). Additionally, for some embodiments a second type of PET support (PET2) (Hydranautics, San Diego, Calif. USA) was used instead of the first type of PET support.

Where membranes were identified as coated with a dye coating instead of filtering the procedure was varied as follows. Instead of filtration the coating solution was deposited on the membrane surface using a die caster (Taku-Die 200, Die-Gate Co., Ltd., Tokyo, Japan), which was set to create the desired coating thickness.

TABLE 1

Membranes Made without a Salt Rejection Layer.

| Membrane | GO (wt %) | Lignin (wt %) | PVA (wt %) | $CaCl_2$ (wt %) | Borate Salt (wt %) | Nano, Silica (wt %/nm) | Support | Coating Meth. | Thickness (nm) | Curing Temp (° C.) | Curing Time (min) |
|---|---|---|---|---|---|---|---|---|---|---|---|
| MD-1.1.1.1 | 15.3 | 76.4 | — | 0.8 | 7.5 | — | PET | Filtration | 200 | 140 | 6 |
| MD-1.1.2.1 | 15.3 | 76.7 | — | 0.8 | 7.2 | — | PET2 | Filtration | 100 | 140 | 6 |
| MD-1.1.3.1 | 15.3 | 76.4 | — | 0.8 | 7.5 | — | PET2 | Filtration | 200 | 140 | 6 |
| MD-1.1.3.2 | 15.3 | 76.3 | — | 0.8 | 7.6 | — | PET2 | Filtration | 300 | 140 | 6 |
| MD-1.1.4.1 | 15.3 | 75.3 | — | 0.8 | 7.5 | 1.1/7 | PET2 | Filtration | 200 | 140 | 6 |
| MD-1.1.5.1 | 15.3 | 74.5 | — | 0.8 | 7.2 | 2.2/7 | PET2 | Filtration | 100 | 140 | 6 |
| MD-1.1.5.2 | 15.3 | 74.2 | — | 0.8 | 7.5 | 2.2/7 | PET2 | Filtration | 200 | 140 | 6 |
| MD-1.1.6.1 | 15.3 | 72.1 | — | 0.8 | 7.5 | 4.3/7 | PET2 | Filtration | 200 | 140 | 6 |
| MD-1.1.7.1 | 15.3 | 74.2 | — | 0.8 | 7.5 | 2.2/20 | PET2 | Filtration | 200 | 140 | 6 |
| MD-1.1.8.1 | 15.3 | 72.1 | — | 0.8 | 7.5 | 4.3/20 | PET2 | Filtration | 200 | 140 | 6 |
| MD-1.1.9.1 | 15.3 | 37.1 | 37.1 | 0.8 | 7.5 | 2.2/20 | PET | Filtration | 200 | 140 | 6 |
| MD-1.1.10.1 | 15.3 | 38.2 | 38.2 | 0.8 | 7.5 | — | PET | Filtration | 200 | 140 | 6 |
| MD-1.1.11.1 | 15.3 | 38.2 | 38.2 | 0.8 | 7.5 | — | PET2 | Filtration | 200 | 140 | 6 |
| MD-1.1.12.1 | 15.3 | 57.3 | 19.1 | 0.8 | 7.5 | — | PET2 | Filtration | 200 | 140 | 6 |
| MD-1.1.13.1 | 15.3 | 72.6 | 3.8 | 0.8 | 7.5 | — | PET | Filtration | 200 | 140 | 6 |
| MD-1.1.14.1 | 15.0 | 25.1 | 50.1 | — | 9.8 | — | PET2 | Die Coat | 225 | 140 | 6 |
| MD-1.1.15.1 | 15.0 | 37.6 | 37.6 | — | 9.8 | — | PET2 | Die Coat | 225 | 140 | 6 |
| MD-1.1.16.1 | 15.0 | 50.1 | 25.1 | — | 9.8 | — | PET2 | Die Coat | 225 | 140 | 6 |
| CMD-1.1.1.1 | 13.2 | — | 76.7 | — | 10.1 | — | PET2 | Die Coat | 225 | 140 | 6 |

Notes:
[1] Numbering Scheme is MD-J.K.L.M, wherein J = 1 - no salt rejection layer; 2 - salt rejection layer K = 1 - no protective coating; 2 - protective coating L = category of membrane M = membrane # within category
[2] (Prop.) - Represents a proposed example.

Example 2.2.1

Addition of a Salt Rejection Layer to a Membrane

To enhance the salt rejection capability of the membrane, MD-1.1.1.1 was additionally coated with a polyamide salt rejection layer. A 3.0 wt % MPD aqueous solution was prepared by diluting an appropriate amount of MPD (Aldrich) in DI water. A 0.14 vol % trimesoyl chloride solution was made by diluting an appropriate amount of trimesoyl chloride (Aldrich) in isoparrifin solvent (Isopar E & G, Exxon Mobil Chemical, Houston Tex., USA). The graphene oxide-MPD coated membrane was then dipped in the aqueous solution of 3.0 wt % of MPD (Aldrich) for a period of 10 seconds to 10 minutes depending on the substrate and then removed. Excess solution remaining on the membrane was then removed by air dry. Then, the membrane was dipped into the 0.14 vol % trimesoyl chloride solution for 10 seconds and removed. The resulting assembly was then dried in an oven (DX400, Yamato Scientific) at 120° C. for 3 minutes. This process resulted in a membrane with a salt rejection layer (MD-2.1.1.1).

Example 2.2.1.1

Addition of a Salt Rejection Layer to Additional Membranes

Additional membranes were coated with a salt rejection layer using a similar procedure as that in Example 2.2.1. The resulting configurations of the new membranes created are presented in Table 2.

Example 2.2.2

Preparation of a Membrane with a Protective Coating (Prophetic)

Any of the membranes can be coated with protective layers. First, a PVA solution of 2.0 wt % can be prepared by stirring 20 g of PVA (Aldrich) in 1 L of DI water at 90° C. for 20 minutes until all granules dissolve. The solution can then be cooled to room temperature. The selected substrates can be immersed in the solution for 10 minutes and then removed. Excess solution remaining on the membrane can then be removed by paper wipes. The resulting assembly can then be dried in an oven (DX400, Yamato Scientific) at 90° C. for 30 minutes. A membrane with a protective coating can thus be obtained.

Example 3.1

Performance Testing of Selected Membranes

Mechanical Strength Testing: The water flux of graphene oxide-lignin based membrane coated on varies porous substrates were found to be very high, which is comparable with porous polysulfone substrate widely used in current reverse osmosis membranes.

Figure 6:
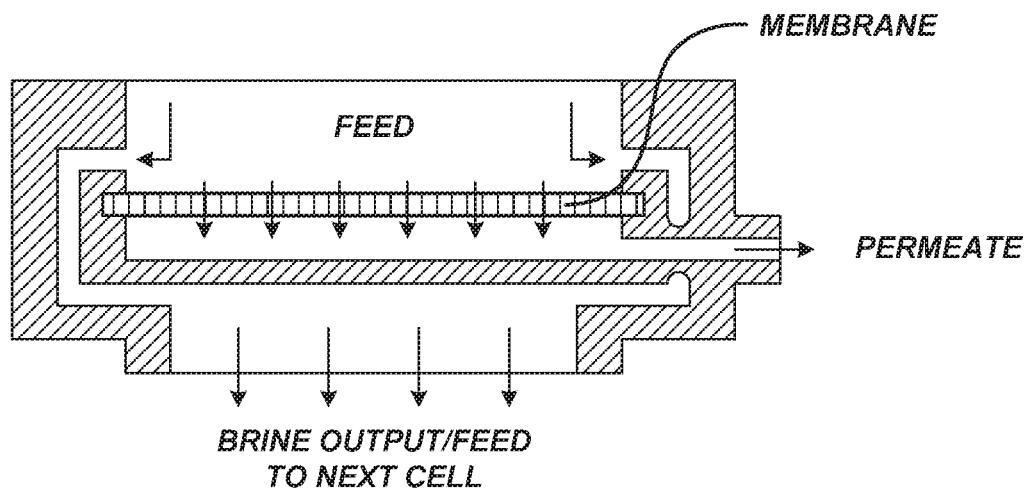
FIG. 6 is a diagram depicting the experimental setup for the water vapor permeability and gas leakage testing.
Figure 7:
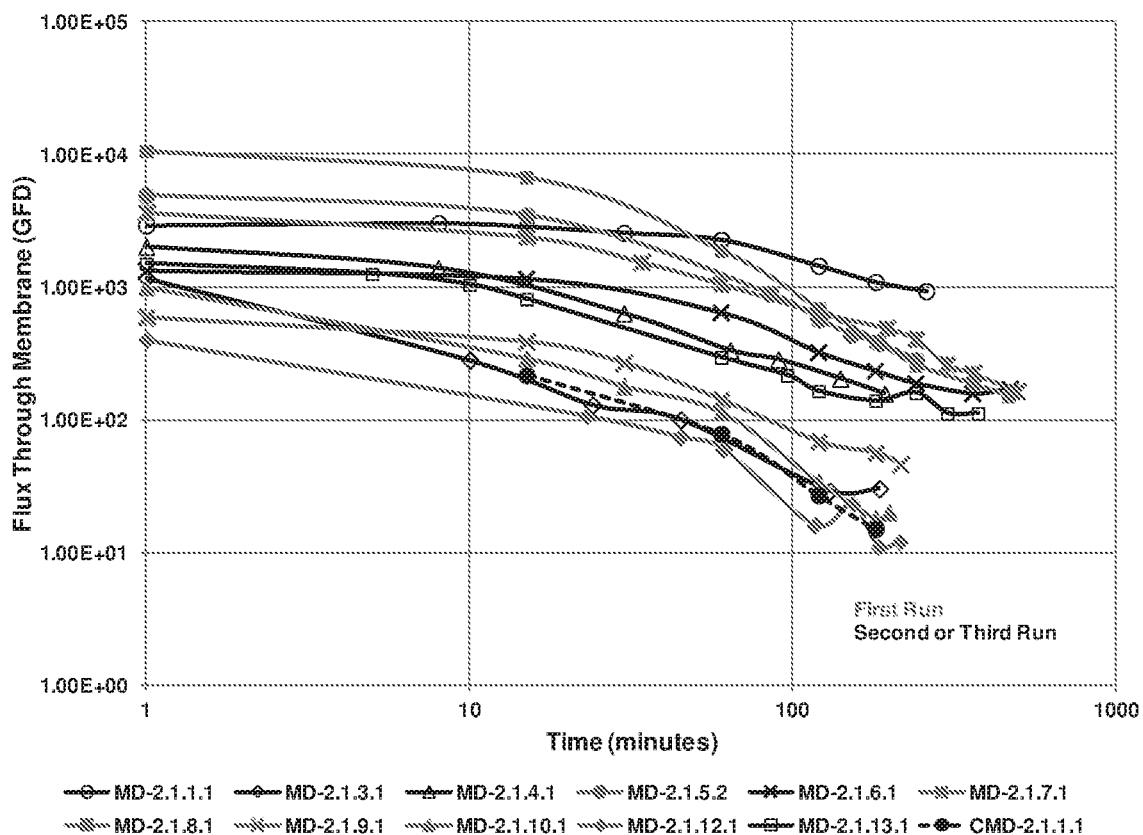
FIG. 7 is a chart showing mechanical performance of various membrane embodiments.

To test the mechanical strength capability, the membranes were tested by placing them into a laboratory apparatus similar to the one shown in FIG. 6. Then, once secure in the test apparatus, the membrane was then exposed to the unprocessed fluid at a gauge pressure of 50 psi. The water flux through the membrane was recorded at different time intervals to see the flux over time. The water flux was recorded at various intervals of time (e.g., 15 minutes, 60 minutes, 120 minutes, and 180 minutes) when possible. As seen in FIG. 7, most membranes showed good mechanical strength by resisting forces created by a head pressure of 50 psi while also showing a water flux better over a comparative membrane. From the data collected, it was shown that the graphene oxide-PVA-based membrane can withstand reverse osmosis pressures while providing sufficient flux.

Salt Rejection Testing: Measurements were done to characterize the membranes' salt rejection performance. The membranes were placed in a test cell, similar to the one described in FIG. 6, where the membranes were subjected to salt-solution of 1500 ppm NaCl at an upstream pressure of

TABLE 2

Membranes with a Salt Rejection Layer.

| Membrane | GO (wt %) | Lignin (wt %) | PVA (wt %) | $CaCl_2$ (wt %) | Borate Salt (wt %) | Nano, Silica (wt %/nm) | Support | Thickness (nm) |
|---|---|---|---|---|---|---|---|---|
| MD-2.1.1.1 (217/18/33) | 15.3 | 76.4 | — | 0.8 | 7.5 | — | PET | 200 |
| MD-2.1.2.1 (227) | 15.3 | 76.7 | — | 0.8 | 7.2 | — | PET2 | 100 |
| MD-2.1.3.1 (219) | 15.3 | 76.4 | — | 0.8 | 7.5 | — | PET2 | 200 |
| MD-2.1.3.2 (220) | 15.3 | 76.3 | — | 0.8 | 7.6 | — | PET2 | 300 |
| MD-2.1.4.1 (223/26) | 15.3 | 75.3 | — | 0.8 | 7.5 | 1.1/7 | PET2 | 200 |
| MD-2.1.5.1 (228) | 15.3 | 74.5 | — | 0.8 | 7.2 | 2.2/7 | PET2 | 100 |
| MD-2.1.5.2 (224/25) | 15.3 | 74.2 | — | 0.8 | 7.5 | 2.2/7 | PET2 | 200 |
| MD-2.1.6.1 (235) | 15.3 | 72.1 | — | 0.8 | 7.5 | 4.3/7 | PET2 | 200 |
| MD-2.1.7.1 (231) | 15.3 | 74.2 | — | 0.8 | 7.5 | 2.2/20 | PET2 | 200 |
| MD-2.1.8.1 (236) | 15.3 | 72.1 | — | 0.8 | 7.5 | 4.3/20 | PET2 | 200 |
| MD-2.1.9.1 (230) | 15.3 | 37.1 | 37.1 | 0.8 | 7.5 | 2.2/20 | PET | 200 |
| MD-2.1.10.1 (229) | 15.3 | 38.2 | 38.2 | 0.8 | 7.5 | — | PET | 200 |
| MD-2.1.11.1 (221) | 15.3 | 38.2 | 38.2 | 0.8 | 7.5 | — | PET2 | 200 |
| MD-2.1.12.1 (222) | 15.3 | 57.3 | 19.1 | 0.8 | 7.5 | — | PET2 | 200 |
| MD-2.1.13.1 (234) | 15.3 | 72.6 | 3.8 | 0.8 | 7.5 | — | PET | 200 |
| MD-2.1.14.1 | 15.0 | 25.1 | 50.1 | — | 9.8 | — | PET2 | 225 |
| MD-2.1.15.1 | 15.0 | 37.6 | 37.6 | — | 9.8 | — | PET2 | 225 |
| MD-2.1.16.1 | 15.0 | 50.1 | 25.1 | — | 9.8 | — | PET2 | 225 |
| CMD-2.1.1.1 | 13.2 | — | 76.7 | — | 10.1 | — | PET2 | 225 |

Notes:
[1] Numbering Scheme is CMD/MD-J.K.L.M, wherein J = 1 - no salt rejection layer; 2 - salt rejection layer K = 1 - no protective coating; 2 - protective coating L = category of membrane M = membrane # within category
[2] (Prop.) - Represents a proposed example.

about 225 psi and the permeate was measured for both flow rate and salt content to determine the membranes' ability to reject salt and retain adequate water flux. The results are shown in Table 3.

TABLE 1

Membrane Salt Rejection Performance.

| Membrane | 1500 ppm NaCl Rejection (%) | Flux at 120 min (GFD) |
|---|---|---|
| GO-PVA/Lignin (0.2:1.0 wt %) (1:2 Lignin:PVA)-10% KBO; PET2; 225 μm (MD-2.1.14.1) | 71.8 | 1.1 |
| GO-PVA/Lignin (0.2:1.0 wt %) (1:1 Lignin:PVA)-10% KBO; PET2; 225 μm (MD-2.1.15.1) | 9.2 | 16.2 |
| GO-PVA/Lignin (0.2:1.0 wt %) (2:1 Lignin:PVA)-10% KBO; PET2; 225 μm (MD-2.1.16.1) | 11.6 | 6.1 |
| GO-PVA (0.2:1.0 wt %)-10% KBO; PET2; 225 μm (CMD-2.1.1.1) | 49.8 | 2.0 |

[1] Cell Testing Conditions: pressure: 225 psi, temperature: 25° C., pH: 6.5-7.0, run flow: 1.5 L/min.

Unless otherwise indicated, all numbers expressing quantities of ingredients, properties such as molecular weight, reaction conditions, and etc. used in herein are to be understood as being modified in all instances by the term "about." Each numerical parameter should at least be construed in light of the number of reported significant digits and by applying ordinary rounding techniques. Accordingly, unless indicated to the contrary, the numerical parameters may be modified according to the desired properties sought to be achieved, and should, therefore, be considered as part of the disclosure. At the very least, the examples shown herein are for illustration only, not as an attempt to limit the scope of the disclosure.

The terms "a," "an," "the" and similar referents used in the context of describing embodiments of the present disclosure (especially in the context of the following claims) are to be construed to cover both the singular and the plural, unless otherwise indicated herein or clearly contradicted by context. All methods described herein may be performed in any suitable order unless otherwise indicated herein or otherwise clearly contradicted by context. The use of any and all examples, or exemplary language (e.g., "such as") provided herein is intended merely to better illustrate embodiments of the present disclosure and does not pose a limitation on the scope of any claim. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability.

Certain embodiments are described herein, including the best mode known to the inventors for carrying out the embodiments. Of course, variations on these described embodiments will become apparent to those of ordinary skill in the art upon reading the foregoing description. The inventor expects skilled artisans to employ such variations as appropriate, and the inventors intend for the embodiments of the present disclosure to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

The invention claimed is:

1. A water permeable membrane comprising:
   a porous support; and
   a composite coated on the porous support comprising a crosslinked graphene oxide compound, wherein the crosslinked graphene oxide compound is formed by reacting a mixture comprising a graphene oxide compound and a crosslinker comprising a lignin;
   wherein the water permeable membrane is water permeable and sufficiently strong to withstand a water pressure of 50 pounds per square inch while controlling water flow through the water permeable membrane.

2. The water permeable membrane of claim 1, wherein the graphene oxide compound is graphene oxide.

3. The water permeable membrane of claim 1, wherein the lignin comprises sodium lignosulfonate, calcium lignosulfonate, magnesium lignosulfonate, or potassium lignosulfonate.

4. The water permeable membrane of claim 1, wherein the crosslinker further comprises a polyvinyl alcohol.

5. The water permeable membrane of claim 1, wherein the composite further comprises a borate salt.

6. The water permeable membrane of claim 5, wherein the borate salt comprises $K_2B_4O_7$, $Li_2B_4O_7$, or $Na_2B_4O_7$, wherein the borate salt is about 20 wt % or less of the composite.

7. The water permeable membrane of claim 1, wherein the composite further comprises $CaCl_2$, wherein the $CaCl_2$ is about 1.5 wt % or less of the composite.

8. The water permeable membrane of claim 1, wherein the composite further comprises silica nanoparticles.

9. The water permeable membrane of claim 8, wherein the silica nanoparticles are about 10 wt % or less of the composite, wherein the average size of the silica nanoparticles is about 5 nm to about 200 nm.

10. The water permeable membrane of claim 1, wherein the porous support is a non-woven fabric.

11. The water permeable membrane of claim 10, wherein the porous support comprises polyethylene terephthalate.

12. The water permeable membrane of claim 1, having a thickness of about 10 nm to about 2000 nm.

13. The water permeable membrane of claim 1, wherein the weight ratio of the crosslinker to the graphene oxide compound is about 2 to about 6.

14. The water permeable membrane of claim 1 further comprising a salt rejection layer to reduce a salt permeability of the water permeable membrane.

15. The water permeable membrane of claim 14, wherein the salt is NaCl.

16. The water permeable membrane of claim 14, wherein the salt rejection layer comprises a polyamide prepared by reacting meta-phenylenediamine and trimesoyl chloride.

17. The water permeable membrane of claim 1, wherein the composite is a layer having a thickness of about 50 nm to about 2000 nm.

18. A method of removing a solute from an unprocessed solution comprising exposing the unprocessed solution to the water permeable membrane of claim 1, wherein the unprocessed solution is passed through the water permeable membrane by applying a pressure gradient across the water permeable membrane.

* * * * *